United States Patent
Vargantwar et al.

(10) Patent No.: US 8,385,266 B1
(45) Date of Patent: Feb. 26, 2013

(54) REVERSE POWER CONTROL PARAMETER ADJUSTMENT BASED ON SUBSCRIBER DISTRIBUTION OF TWO PROTOCOL VERSIONS

(75) Inventors: Sachin R. Vargantwar, Overland Park, KS (US); Deveshkumar Rai, Overland Park, KS (US); Bhagwan Khanka, Lenexa, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 474 days.

(21) Appl. No.: 12/699,362

(22) Filed: Feb. 3, 2010

(51) Int. Cl.
*H04W 4/00* (2009.01)
(52) U.S. Cl. .................................................. 370/328
(58) Field of Classification Search .............. 370/241, 370/252, 310, 328; 455/39, 500, 507, 517, 455/522
See application file for complete search history.

(56) References Cited

U.S. PATENT DOCUMENTS

| | | | | |
|---|---|---|---|---|
| 6,757,549 B2 * | 6/2004 | Riedl | | 455/522 |
| 7,136,666 B2 * | 11/2006 | Charriere et al. | | 455/522 |
| 7,184,791 B2 * | 2/2007 | Nilsson et al. | | 455/522 |
| 7,489,943 B2 * | 2/2009 | Jones | | 455/522 |
| 8,199,696 B2 * | 6/2012 | Sarkar et al. | | 370/328 |
| 2004/0014481 A1 * | 1/2004 | Riedl | | 455/522 |
| 2005/0030976 A1 * | 2/2005 | Wentink | | 370/473 |
| 2005/0032536 A1 * | 2/2005 | Wei et al. | | 455/517 |
| 2005/0159116 A1 * | 7/2005 | Xiong | | 455/127.1 |
| 2006/0203746 A1 * | 9/2006 | Maggenti et al. | | 370/254 |
| 2007/0253352 A1 * | 11/2007 | Arisha et al. | | 370/328 |
| 2008/0253308 A1 * | 10/2008 | Ward et al. | | 370/310 |
| 2010/0056197 A1 * | 3/2010 | Attar et al. | | 455/522 |
| 2010/0124886 A1 * | 5/2010 | Fordham et al. | | 455/67.11 |
| 2011/0149769 A1 * | 6/2011 | Nagaraja | | 370/252 |
| 2011/0159914 A1 * | 6/2011 | Chen et al. | | 455/522 |

* cited by examiner

*Primary Examiner* — Chi Pham
*Assistant Examiner* — Robert Lopata

(57) ABSTRACT

A method and system is disclosed for dynamic adaptation of reverse-link power control based on the distribution of ATs implementing different protocol versions. An access terminal in a wireless communication system that includes a base station may operate in a first state in which, at least, the access terminal uses a first protocol for determining and adjusting transmission power on a reverse link of an air interface with the base station. While operating in the first state, responsive to receiving a protocol version message from the base station on a forward link of the air interface, the access terminal will transition to operating in a second state in which, at least, the access terminal uses a second protocol for determining and adjusting transmission power on the reverse link of the air interface with the base station. The first protocol is different from the second protocol.

25 Claims, 7 Drawing Sheets

REVERSE POWER CONTROL PARAMETER ADJUSTMENT BASED ON SUBSCRIBER DISTRIBUTION OF TWO PROTOCOL VERSIONS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

Overview

An AT receives data from a base station on a "forward link" and sends data to the base station on a "reverse link." Data on either link are encoded by the sender and decoded by the receiver. The rate at which data can be transmitted on either link depends in part on the RF conditions of the respective link as well as the power level at which the data are transmitted. Better RF conditions and/or higher transmission power (e.g., higher signal-to-noise characteristics of a link) generally supports higher data rates, and vice versa. RF conditions may include factors such as noise and interference, while transmission power level is generally specified in accordance with one or more power-control procedures that are aimed at balancing the transmission power required to accommodate a given data rate with the impact of allocating the requisite power on one or another form of power budget and/or on RF interference.

Power-control procedures, together with various other operational procedures carried out by ATs and the RAN (among other elements, entities, and components of a wireless communication system) are typically implemented in compliance with one or another industry standard or protocol. Standards and protocols may be revised or updated in concert with the advancement of relevant technologies and/or with operational and practical experience gained over time. Revisions or updates to a given protocol are usually introduced through release of new versions of the given protocol, although a new version of a protocol may sometimes be considered a new protocol if the revisions are significant enough. In practice, implementations of "old" and "new" versions of a protocol may coexist for in order to support operation of both "old" and "new" devices and components in the system; i.e., devices that respectively implement the old and new versions of the protocol. It is also common for newer devices and components to implement both the old (legacy) version of a protocol as well as the new version, in order to support backward compatibility.

Although concurrent support for two (or more) different versions of a protocol can accommodate the coexistence of devices that implement the different protocol versions, mixed operation of devices according two (or more) different versions of a protocol can, in practice, result in interactions and behaviors that degrade performance of individual devices and/or of the overall system. The nature of the interactions and behaviors and the severity of the performance degradation generally depend on the particular procedures being carried out in accordance with the different protocol versions, as well as on the relative mix of devices implementing the different protocol versions at any given time. In the case of power-control procedures, mixed protocol versions can impact the achievable and/or allowable transmission power levels on one or another link, and thereby impact data rates and throughput.

More particularly, reverse-link power-control procedures under IS-856, Rel. 0 differ from reverse-link power-control procedures under IS-856, Rev. A in a manner that can, in conventional operation, lead to degraded reverse-link performance of IS-856, Rel. 0 access terminals compared with IS-856, Rev. A access terminals, or vice versa, when access terminals of both types operate concurrently in the same sector. Which type of access terminal suffers degradation compared with the other, and the severity of the degradation, can depend on the relative numbers of each type in the sector, among other factors. It would therefore be advantageous to be able to adapt reverse-link power-control procedures in a way that compensates for or mitigates service degradation that can result from mixed operation of the different protocols. Accordingly, embodiments of the present invention advantageously provide dynamic adaptation of reverse-link power control protocols based on the relative numbers of access terminals operating according to different protocols or protocol versions in a sector (or other form of coverage area).

Hence in one respect, various embodiments of the present invention provide, in an access terminal operating in a wireless communication system that includes a base station, a method comprising: operating in a first state in which at least: the access terminal uses a first protocol for determining and adjusting transmission power on a reverse link of an air interface with the base station; while operating in the first state, receiving a protocol version message from the base station on a forward link of the air interface and responsively transitioning to operating in a second state in which at least: the access terminal uses a second protocol for determining and adjusting transmission power on the reverse link of the air interface with the base station, wherein the first protocol is different from the second protocol.

In another respect, various embodiments of the present invention provide, in a base station operating as part of a wireless communication system and configured to serve both a first type of access terminal capable of operating according to a first and a second protocol for reverse power control, and a second type of access terminal capable of operating only according to the second protocol, wherein the first protocol is different from the second protocol, a method comprising: serving a total number of access terminals of both the first and second types, wherein serving any given access terminal of either type comprises transmitting data to and receiving data from the given access terminal via an air interface link with the given access terminal; determining a ratio of a number of access terminals of the second type being served by the base station to the total number of access terminals of both the first and second types being served by the base station; setting a first threshold error rate based on the determined ratio, the first threshold error rate (i) corresponding to a threshold rate of errors in transmissions received from access terminals of the first type, and (ii) being used by the base station to modulate reverse power-control commands sent to access terminals of the first type being served by base station; and setting a second threshold error rate based on the determined ratio, the second threshold error rate (i) corresponding to a threshold rate of errors in transmissions received from access terminals of the second type, and (ii) being used by the base station to modulate reverse power-control commands sent to access terminals of the second type being served by base station.

In yet another respect, various embodiments of the present invention provide an access terminal configured for operating in wireless communication system that includes a base station, the access terminal comprising: means for operating in a first state in which at least: the access terminal uses a first protocol for determining and adjusting transmission power on a reverse link of an air interface configured for communicating with the base station; means for operating in a second state in which at least: the access terminal uses a second protocol for determining and adjusting transmission power on the reverse link of the air interface; means for receiving a protocol version message from the base station on a forward link of the air interface while operating in the first state; and means for transitioning from operating the first state to operating in the second state in response to receiving the protocol version message from the base station, wherein the first protocol is different from the second protocol.

In still another respect, various embodiments of the present invention provide a base station configured to operate as part of a wireless communication system, and further configured to serve both a first type of access terminal capable of operating according to a first and a second protocol for reverse power control, and a second type of access terminal capable of operating only according to the second protocol, wherein the first protocol is different from the second protocol, the base station comprising: means serving a total number of access terminals of both the first and second types, wherein serving any given access terminal of either type comprises transmitting data to and receiving data from the given access terminal via an air interface link with the given access terminal; means for determining a ratio of a number of access terminals of the second type being served by the base station to the total number of access terminals of both the first and second types being served by the base station; means for setting a first threshold error rate based on the determined ratio, the first threshold error rate (i) corresponding to a threshold rate of errors in transmissions received from access terminals of the first type, and (ii) being used by the base station to modulate reverse power-control commands sent to access terminals of the first type being served by base station; and means for setting a second threshold error rate based on the determined ratio, the second threshold error rate (i) corresponding to a threshold rate of errors in transmissions received from access terminals of the second type, and (ii) being used by the base station to modulate reverse power-control commands sent to access terminals of the second type being served by base station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1×-RTT" communications, also abbreviated as just "1×." However, since IS-2000 supports both circuit voice and packet data communications, the term 1×(or 1×-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1×-RTT may be similarly distinguished. Absent any specific version identification, EVDO will generally refer to any version of IS-856. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
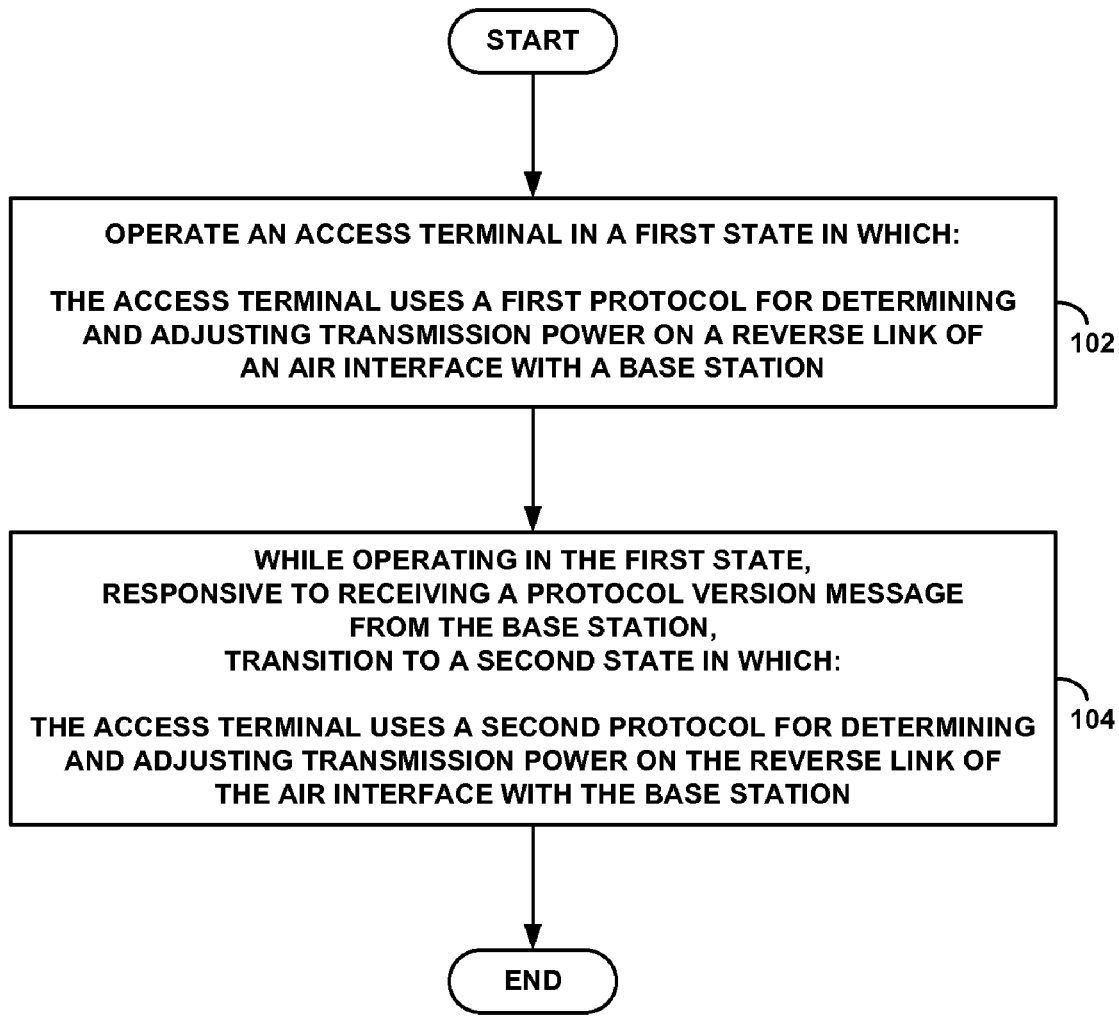
FIG. 1 is a flowchart illustrating an example embodiment of dynamic adaptation of reverse-link power control based on the distribution of ATs implementing different protocol versions.

FIG. 1 is a flowchart illustrating an example embodiment of dynamic adaptation of reverse-link power control based on the distribution of ATs implementing different protocol versions. By way of example, the steps of the flowchart could be implemented in an access terminal in a wireless communication system that includes a base station (among other elements of a RAN), and that operates according to a CDMA family of protocols. At step 102, the access terminal operates in a first state in which, at least, the access terminal uses a first protocol for determining and adjusting transmission power on a reverse link of an air interface with the base station. In accordance with the example embodiment, the first state could be an "active state" in which the access terminal is engaged in a communication session (e.g. an EVDO communication session) or call via the base station. In such an active state, the AT will transmit to the base station on the reverse link of the air interface at a power level set using reverse-link power control procedures that are specified according to (or compliant with) the first protocol.

At step 104, while operating in the first state, the AT responds to receiving a protocol version message from the base station by transitioning to operating in a second state in which, at least, the access terminal uses a second protocol for determining and adjusting transmission power on the reverse link of the air interface with the base station. In accordance with the example embodiment, the first protocol is different from the second protocol. The second state could be an active state in which the access terminal is engaged in the same communication session or call via the base station as in the first state. Operating in the second state, however, the AT will transmit to the base station on the reverse link at a power level set using reverse-link power control procedures that are specified according to (or compliant with) the second protocol.

In accordance with the example embodiment, the base station could comprise a BTS and one or more cells or sectors (or other form of coverage area), and the AT could receive the protocol version message from the BTS while operating in the cell or sector. In this arrangement, the reverse link of the air interface could include a data traffic channel for transmitting data to the BTS. Further, using the first protocol for determining and adjusting transmission power on a reverse link of an air interface with the base station could comprise receiving a given noise-level message from the BTS, the given noise-level message indicating an aggregate loading condition due to transmissions to the BTS from one or more access terminals (including the AT) in the cell or sector. Then, in a manner governed at least in part by the first protocol, AT could use the given noise-level message to determine both a first transmission power level for the data traffic channel and a first reverse-link data rate for the data traffic channel. The AT would transmit data on the data traffic channel at the determined first reverse-link data rate and the determined first transmission power level.

In further accordance with the example embodiment, using the second protocol for determining and adjusting transmission power on a reverse link of an air interface with the base station could comprise receiving a particular noise-level message from the BTS, the particular noise-level message also indicating an aggregate loading condition due to transmissions to the BTS from one or more access terminals (including the AT) in cell or sector. Then, in a manner governed at least in part by the second protocol, AT could use the particular noise-level message to determine both a second transmission power level for the data traffic channel and a second reverse-link data rate for the data traffic channel. The AT would transmit data on the data traffic channel at the determined second reverse-link data rate and determined second transmission power level.

As described above by way of example, both the terminal and the wireless communication system both operate according to a CDMA family of protocols including IS-856, Rel. 0 and IS-856, Rev. A, (or EVDO, Rel. 0 and EVDO, Rev. A, as referred to below). Accordingly, both the given noise-level message and the particular noise-level message could comprise a reverse activity bit (RAB) set by the BTS and transmitted to the AT on a forward-link Reverse Activity Channel. The manner in which the RAB is used by the AT is determined according which of the first and second protocols is in effect when the RAB is received.

For an AT and base station operating according to EVDO, the AT's reverse link includes a pilot channel and a data traffic channel (among other channels). The AT's pilot channel carries a beacon (or pilot) signal that the base station uses for (among other purposes) maintaining a timing reference for decoding other reverse-link signals from the AT. The AT's data traffic channel carries user data. The AT's pilot signal power level is set based on power-control commands received from the base station. According to EVDO, Rev. A, the AT's reverse-link data traffic channel power is set relative to the pilot channel power by a multiplicative factor referred to as "traffic-to-pilot" (abbreviated "T2P"). During an active data session, the AT periodically adjusts its data traffic channel power by periodically setting its T2P value. The AT sets its T2P value based, in part, on tracking the RAB reported by the base station and on the amount of data the AT has to transmit.

In practice, the power level of both the pilot and data traffic channels are usually specified as a gain level, x, according to the relation x dBm=10 log$_{10}$(P/1 mW), where P is the power in mW (milliwatts). As a relative level, T2P is then expressed in dB with respect to the pilot power. For example, T2P=+3 dB would correspond to a data traffic channel power twice that of the pilot channel, and T2P=+6 dB would correspond to a data traffic channel power four times that of the pilot channel. The total power of the reverse link pilot and data traffic channels would then be the sum of the powers of the individual channels. In terms of absolute power, a pilot power of 1 Watt and T2P=+3 dB would correspond to data traffic channel power of 2 Watts and a total power of 3 Watts. Similarly, if T2P=+6 dB, the total reverse link power of the pilot plus data traffic channels would be 5 Watts in this example.

Under EVDO, Rel. 0, the AT selects a reverse-link data channel transmission data rate in a probabilistic manner, using the RAB reported by the base station to decide whether to apply a probabilistic test to increase its current transmission rate or a different probabilistic test to decrease its current transmission rate, each probabilistic test determining whether and how much to increase or decrease the rate. The AT then adjusts the power of its reverse-link data traffic channel to accommodate the selected rate. Reverse power control according to EVDO, Rev. A and EVDO, Rel. 0 is described in additional detail below.

As is well-known in the art, EVDO, Rev. A is a later (or newer) version of EVDO than EVDO, Rel. 0. To the extent that an AT operating according to EVDO, Rev. A determines and adjusts its reverse-link transmission power differently than an AT operating according to EVDO, Rel. 0, the two versions may be considered different protocols, at least for the purposes of the discussion herein. Accordingly, the first protocol associated with the first state in step 102 could be EVDO, Rev. A, and the second protocol associated with the second state in step 104 could be EVDO, Rel. 0. Alternatively, the first protocol associated with the first state in step 102 could be EVDO, Rel. 0, and the second protocol associated with the second state in step 104 could be EVDO, Rev. A. In either case, the access terminal is taken to be one that can operate according to both versions of EVDO, and therefore is capable of transitioning from operating in the first state to operating in the second state.

Conventionally, an access terminal that is capable of operating only according to EVDO, Rel. 0 is referred to as an "EVDO, Rel. 0 AT" or just a "Rel. 0 AT." Similarly, an access terminal capable of operating according to EVDO, Rev. A is conventionally referred to as an "EVDO, Rev. A AT" or just a "Rev. A AT." Note, however, that a Rev. A AT may be capable of operating according to EVDO, Rel. 0 as well as EVDO, Rev. A, while a Rel. 0 AT is capable of operating only according to EVDO, Rel. 0. Indeed, since a current (or "old") protocol version is not usually retired when an updated ("new") version is released in a wireless communication system, new and old protocol versions will commonly coexist for some (possibly indefinite) amount of time following release of the new version. Consequently, dual support for "new" and "old" version capability is common for newer devices and components, at least as a means for supporting backward compatibility. In the case of EVDO, a "Rev. A access terminal" will be understood, then, to be an access terminal that supports both EVDO, Rev. A and EVDO, Rel. 0.

In further accordance with the example embodiment, the base station could be configured to serve both a first type of access terminal that is capable of operating according to both the first protocol and the second protocol, and a second type of access terminal that is capable of operating only according to the second protocol. In keeping with the description above, the access terminal of the example embodiment would then be considered the first type. In still further accordance with the example embodiment, receiving the protocol version message from the base station could comprise receiving an indication that the base station is serving a number of access terminals of the second type that is larger than a threshold fraction of a total number of access terminals of both the first and second types being served by the base station. For example, if the number of access terminals of the first type being served is $N_1$, the number of the second type being served is $N_2$, and the threshold fraction is $f_{thresh}$, then the threshold condition can be expressed as $N_2 > f_{thresh} \times (N_1 + N_2)$. It will be appreciated that this expression could be written (and applied) in numerous algebraically equivalent forms (e.g., $N_2/(N_1+N_2) > f_{thresh}$).

Taking the first protocol to be EVDO, Rev. A and the second protocol to be EVDO, Rel. 0, the first type of access terminal to be a Rev. A AT, and the second type to be a Rel. 0 AT, the above expression could be written as $N_{Rel.0} > f_{thresh} \times (N_{Rev.A} + N_{Rel.0})$. In this rewritten form, the subscripts "1" and "2" have been replaced by "Rev. A" and "Rel. 0." Thus, in accordance with the example embodiment, when a Rev. A AT carrying out reverse-link power control according to EVDO, Rev. A receives a protocol version message from the base station indicating that $N_{Rel.0} > f_{thresh} \times (N_{Rev.A} + N_{Rel.0})$, the Rev. A AT will transition to carrying out reverse-link power control according to EVDO, Rel. 0. By way of example, $f_{thresh}$ could be 0.9. Advantageously, then, if the fraction of Rel. 0 ATs in a cell or sector exceeds 0.9 (or, more generally, $f_{thresh}$) the Rev. A AT would behave as Rel. 0 ATs, and all of the ATs in the cell or sector would exercise the same reverse power control procedures. It will be appreciated that other values of $f_{thresh}$ could be used.

Also in accordance with the example embodiment, a first type of access terminal could again define one that is capable of operating according to both the first protocol and the second protocol, while a second type of access terminal could define one that is capable of operating only according to the first protocol. The access terminal of the example embodiment would once more be considered the first type. In this alternate description, receiving the protocol version message from the base station could comprise receiving an indication that the base station is serving a number of access terminals of the second type does not exceed a threshold fraction of a total number of access terminals of both the first and second types being served by the base station. Taking $N_1$ as defined above and $N_{2'}$ to be the number of access terminals of the (differently-defined) second type being served, this threshold condition can be expressed as $N_{2'} \leq f_{thresh} \times (N_1 + N_{2'})$. It will again be appreciated that this expression could be written (and applied) in numerous algebraically equivalent forms (e.g., $N_{2'}/(N_1+N_{2'}) \leq f_{thresh}$).

Considering in this case the first protocol to be EVDO, Rel. 0 and the second protocol to be EVDO, Rev. A, the first type of access terminal is again a Rev. A AT, and again the second type is again a Rel. 0 AT. Now the above expression in the alternate description can be written as $N_{Rel.0} \leq f_{thresh} \times (N_{Rev.A} + N_{Rel.0})$. In this rewritten form, the subscripts "1" and "2'" have been replaced by "Rev. A" and "Rel. 0." Thus, in accordance with the example embodiment, when a Rev. A AT carrying out reverse-link power control according to EVDO, Rel. 0 receives a protocol version message from the base station indicating that $N_{Rel.0} \leq f_{thresh} \times (N_{Rev.A} + N_{Rel.0})$, the Rev. A AT will transition to carrying out reverse-link power control according to EVDO, Rev. A. Again by way of example, $f_{thresh}$ could be 0.9. Advantageously, then, if the fraction of Rel. 0 ATs in a cell or sector does not exceed 0.9 (or, more generally, $f_{thresh}$) the Rev. A AT would carry out reverse power control according to EVDO, Rev. A. It will be appreciated that other values of $f_{thresh}$ could be used. Additionally, different values of $f_{thresh}$ could be used for the two different threshold conditions described above.

Note that the characterization of the first state of step 102 in terms of the access terminal using the first protocol for determining and adjusting transmission power on the reverse link of an air interface with the base station should not be viewed as limiting the first state to only the described behavior of that state. The first state could include other behaviors as well, provided those other behaviors don't contradict or are not mutually exclusive with the explicitly-described behavior of the first state. Similarly, the characterization of the second state of step 104 in terms of the access terminal using the second protocol for determining and adjusting transmission power on the reverse link of the air interface with the base station should not be viewed as limiting the second state to only the described behavior of that state. As with the first state, the second state could include other behaviors as well, provided those other behaviors don't contradict or are not mutually exclusive with the explicitly-described behavior of the second state.

In the discussion of FIG. 1, as well as in other discussions and explanations herein, the terms "first" and "second" as applied to "states," "protocols," and the like, are used as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention.

Figure 2:
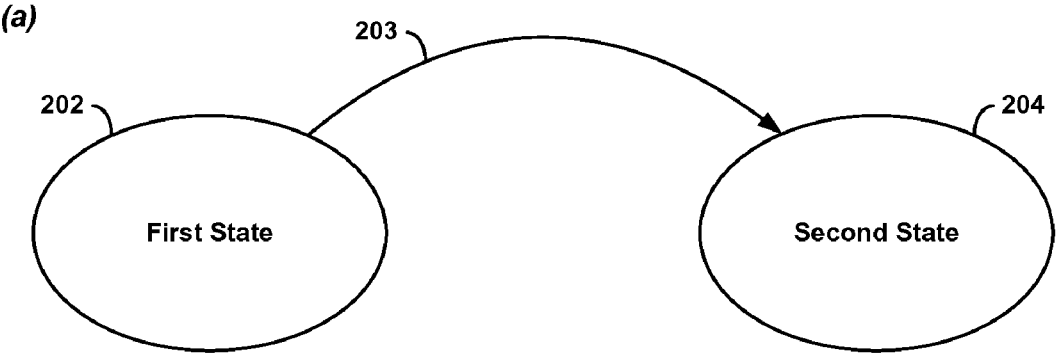
FIG. 2 is a state diagram illustrating an example embodiment of dynamic adaptation of reverse-link power control based on the distribution of ATs implementing different protocol versions.
Figure 2:
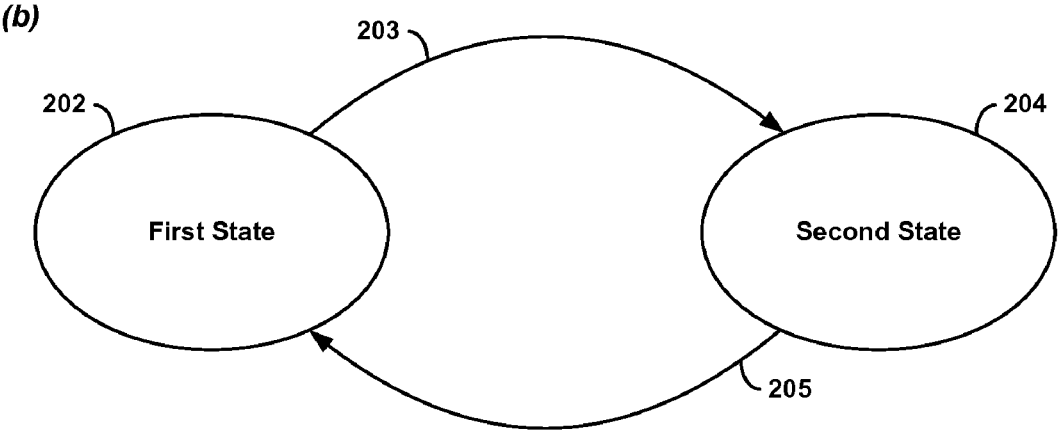

FIG. 2 provides a simple illustration of the first and second states and the transitions between them. In panel (a) at the top, an access terminal is operating in the first state 202, wherein operation in the first state is characterized by the description above. Responsive to receiving a protocol version message from the base station, the access terminal makes a transition 203 to operating in the second state 204, wherein operation in the second state is also characterized above.

Taking the first protocol to be EVDO, Rev. A and the second protocol to be EVDO, Rel. 0, the number of a Rev. A ATs being served by the base station to be $N_{Rev.A}$, and the number of a Rel. 0 ATs being served by the base station to be $N_{Rel.0}$, the protocol version message could be an indication that a threshold condition $N_{Rel.0} > f_{thresh} \times (N_{Rev.A} + N_{Rel.0})$ has been met. In this case, transition 203 takes the AT from carrying out reverse-link power control according to EVDO, Rev. A to carrying out reverse-link power control according to EVDO, Rel. 0.

Alternatively, taking the first protocol to be EVDO, Rel. 0 and the second protocol to be EVDO, Rev. A, the protocol version message could be an indication that a threshold condition $N_{Rel.0} \leq f_{thresh} \times (N_{Rev.A} + N_{Rel.0})$ has been met. In this case, transition 203 takes the AT from carrying out reverse-link power control according to EVDO, Rel. 0 to carrying out reverse-link power control according to EVDO, Rev. A.

The bottom panel (b) in FIG. 2 illustrates a transition 205 from the second state back to the first state. For example, if the first protocol is EVDO, Rev. A and the second protocol is EVDO, Rel. 0, then transition 203 could correspond to receiving a message indicating that the threshold condition $N_{Rel.0} > f_{thresh} \times (N_{Rev.A} + N_{Rel.0})$ has been met. In this case, transition 205 could correspond to thereafter receiving a message indicating the threshold condition $N_{Rel.0} \leq f_{thresh} \times (N_{Rev.A} + N_{Rel.0})$ has subsequently been met. Alternatively, if the first protocol is EVDO, Rel. 0 and the second protocol is EVDO, Rev. A, then transition 203 could correspond to receiving a message indicating that the threshold condition $N_{Rel.0} \leq f_{thresh} \times (N_{Rev.A} + N_{Rel.0})$ has been met. In this alternative case, transition 205 could correspond to thereafter receiving a message indicating the threshold condition $N_{Rel.0} > f_{thresh} \times (N_{Rev.A} + N_{Rel.0})$ has subsequently been met.

Further, a different value $f_{thresh}$ could be used for each of the two threshold conditions. For instance, a value of 0.9 could be used for the first ($N_{Rel.0} > f_{thresh} \times (N_{Rev.A} + N_{Rel.0})$), while a value of 0.8 could be used for the second ($N_{Rel.0} \leq f_{thresh} \times (N_{Rev.A} + N_{Rel.0})$). Other values could be used as well.

Figure 3:
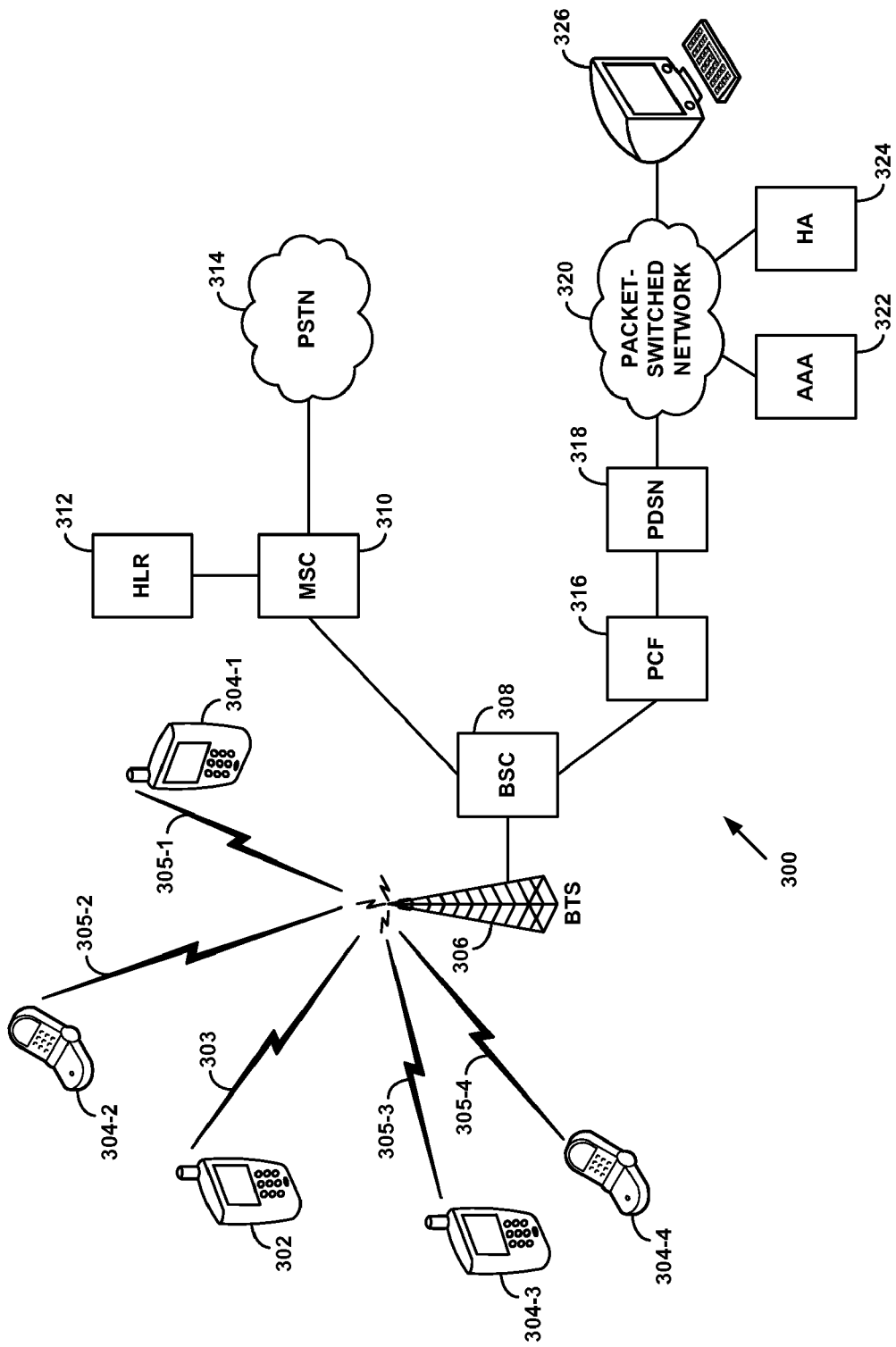
FIG. 3 is a simplified block diagram of a wireless communication system in which an example embodiment of dynamic adaptation of reverse-link power control based on the distribution of ATs implementing different protocol versions can be employed.

FIG. 3 shows a simplified block diagram of a wireless communication system 300 in which an example embodiment of dynamic adaptation of reverse-link power control based on the distribution of ATs implementing different protocol versions can be employed. Access terminal AT 302 communicates over an air interface 303 with a BTS 306, which is then coupled or integrated with a BSC 308. Transmissions over air interface 303 from BTS 306 to AT 302 represent the forward link to the access terminal (also referred to herein alternatively as the forward link from the base station, and as "the AT's forward link"). Transmissions over interface 303 from AT 302 to BTS 306 represent the "reverse link" (also referred to herein as "the AT's reverse link"). Four other access terminals, AT 304-1, 304-2, 304-3, and 304-4, are also depicted in FIG. 3. As indicated, they communicate with BTS 306 over air interfaces 305-1, 305-2, 305-3, and 305-4, respectively. Each of these air interfaces is operationally similar to air interface 303, each representing at least a forward and reverse link. It will be appreciated that this arrangement is for purposes of illustration.

In order to illustrate a mixed distribution of access terminals that implement different protocol versions of reverse-link power control procedures (as well as other operational procedures), two different icons (or cartoons) are used to represent the access terminals in FIG. 3. Specifically, ATs 301, 304-1, and 304-3 are depicted with an icon resembling a PDA-like device, while ATs 304-2 and 304-4 are depicted with an icon resembling a "flip phone." For the purposes of the present discussion, ATs 301, 304-1, and 304-3 are taken to be access terminals of a first type that is capable of operating according to both a first and second protocol for determining and adjusting transmission power on a reverse link of an air interface with a base station, while ATs 304-2 and 304-4 are taken to be access terminals of a second type that is capable of operating only according the second protocol. By way of example, the first protocol could be IS-856, Rev. A, the second protocol could be IS-856, Rel. 0. It will be appreciated that each of these protocols govern or specify other operations and procedures in a wireless communication system beside reverse-link power control. It will also be appreciated that the particular icons depicted in FIG. 3 serve as visual cues for the different types of ATs discussed, and are not necessarily intended to imply other aspects or characteristics of the access terminals.

BSC 308 is connected to MSC 310, which acts to control assignment of air traffic channels (e.g., over air interfaces 303, 305-1, 305-2, 305-3, and 305-4), and provides access to wireless circuit-switched services such as circuit-voice and circuit-data (e.g., modem-based packet data) service. As represented by its connection to PSTN 314, MSC 310 is also coupled with one or more other MSCs or other telephony circuit switches in the operator's (or in a different operator's) network, thereby supporting user mobility across MSC regions, and local and long-distance landline telephone services. Also connected to MSC 310 is home location register (HLR) 312, which supports mobility-related aspects of subscriber services, including dynamic tracking of subscriber registration location and verification of service privileges.

As shown, BSC 308 is also connected with a PDSN 318 by way of packet control function (PCF) 316. PDSN 318 in turn provides connectivity with a packet-switched network 320, such as the Internet and/or a wireless carrier's private core packet-network. Sitting as nodes on network 320 are, by way of example, an authentication, authorization, and accounting (AAA) server 322, a mobile-IP home agent (HA) 324, and a remote computer 326. After acquiring an air traffic channel over its air interface, an access terminal (e.g., AT 302) may send a request to PDSN 318 for a connection in the packet data network. Then, following authentication of the access terminal by AAA server 320, the access terminal may be assigned an IP address by the PDSN or by HA 324, and may thereafter engage in packet-data communications with entities such as remote computer 326.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 302, 304-1, 304-2, 304-3, and 304-4 typically comprises a user-interface, I/O components, a communication interface, a tone detector, a processing unit, and data storage, all of which may be coupled together by a system bus or other mechanism. As such, system 300, ATs 302, 304-1, 304-2, 304-3, and 304-4, and air interfaces 303, 305-1, 305-2, 305-3, and 305-4 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Data sent on both the forward and reverse links are first assembled into units called frames, which are then encoded for transmission to or from the access terminal at regular intervals (corresponding to a frame rate), typically 20 milliseconds in duration (although other frame intervals can be used). As a result of imperfect transmission, some frames received by the AT on the forward link or by the base station on the reverse link may contain errors. Other frames—ideally, the majority of them—will be received without errors. It may also be possible through one or another coding technique to correct certain errors in frames.

On either link, the receiving entity (e.g., AT or base station) can compute a ratio of (i) the number of error-containing frames received during a given period of time to (ii) the total number of frames received during the same period of time. This ratio, computed by the AT on the forward link and by the base station on the reverse link, is called the frame error rate (FER). The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa. For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. In accordance with the discussion above, further details of power control will be described with reference only the reverse link. However, it should be understood that, except for switching operational roles of an access terminal and a base station (i.e., roles with respect to sending and responding to power-control commands described below), the basic principles apply to the forward link as well.

More specifically, for inner-loop power control, the base station measures (for each reverse link) SNR of an AT's pilot signal at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the base station compares $E_b/N_0$ of the AT's pilot with a threshold value called $(E_b/N_0)_{setpoint}$ and responsively sets and sends a power control bit to the AT in order to affect a power adjustment of its pilot. In practice, power adjustment is applied to the pilot in terms of gain relative to a current power level, and measured in dB. For $E_b/N_0 \leq (E_b/N_0)_{setpoint}$, the base station sets the power control bit to "power up," and the AT responsively increases the reverse link gain of its pilot by a small amount (typically 1 dB or less). For $E_b/N_0 > (E_b/N_0)_{setpoint}$, the base station sets the power control bit to "power down," and the AT responsively decreases the reverse link gain of its pilot by the same small amount. In this manner, the reverse link power rapidly converges, in small increments or decrements, to a level where $E_b/N_0 \approx (E_b/N_0)_{setpoint}$ and thereafter hovers about $(E_b/N_0)_{setpoint}$ until $(E_b/N_0)_{setpoint}$ is adjusted to a new value by outer-loop power control. Each transmission by the base station of the power control bit set to power up is commonly referred to as a "power-up command." Similarly, each transmission of the power control bit set to power down is referred to as a "power-down command."

For outer-loop power control on the reverse link, the base station computes the FER in consecutive windows, each being an integer number of frames in duration. Thus, in each window, FER may be expressed as the number of frames with errors divided by the number of frames per window. Typically, the duration of a window is 20 frames, although other window sizes (number of frames per window) could be used. For each window, the base station compares the computed FER with a reverse-link Target FER (TFER). If the computed FER is less than TFER, the base station decreases $(E_b/N_0)_{setpoint}$. Conversely, if the computed FER is greater than TFER, the base station increases $(E_b/N_0)_{setpoint}$. In this manner, a computed FER that exceeds the target FER drives the inner-loop power control to increase the reverse-link power, while a computed FER that is below the target FER drives the inner-loop power control to decrease the reverse-link power. Accordingly, the target FER may be considered as a modulating factor in the application of the inner-loop power-control commands by the base station, and the base station may be considered as using the target FER to modulate the reverse power-control commands sent to ATs.

In the context of a CDMA family of protocols, the power control methods described in the preceding are sometime referred to as "inner-loop power-control protocols" and "outer-loop power-control protocols." It should also be noted that additional or alternative methods of power control may be applied to either of the forward or reverse links.

With the arrangement described above, an access terminal can engage in cellular voice and/or in packet-data communications. Referring again to FIG. 3, and taking an originating call from AT 302 as an example, AT 302 first sends an origination request over air interface 303 and via the BTS 306 and BSC 308 to MSC 310. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1×-RTT), the BSC signals to the PDSN 318 by way of PCF 316. The PDSN 318 and access terminal 302 then negotiate to establish a data link layer connection, such as a point to point protocol (PPP) session. Further, the PDSN 318 sends a foreign agent advertisement that includes a challenge value to the access terminal, and the access terminal responds with a mobile-IP registration request (MIP RRQ), including a response to the challenge, which the PDSN forwards to HA 324. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; a Rel. 0 AT can achieve a maximum reverse-link burst rate of 153.6 kilobits per second (kbps), while a Rev. A AT achieve a maximum reverse-link burst rate of 1.8 Megabits per second (Mbps).

Power control of the reverse link under IS-856 includes inner-loop and outer-loop procedures largely similar to those of IS-2000 described above to control the pilot power level of access terminals, as well as adjustment of data channel transmission power and transmission rates according to procedures compliant with one or another of Rel. 0 and Rev. A versions. Under IS-856, the base station sends inner-loop power-control commands 600 times per second (once per time slot), and the uses a target packet error rate instead of a target frame error to modulate the power-control commands. As described briefly above, the AT adjusts its data channel transmission power and transmission rate relative to its pilot power level based on the RAB received from the base station and on the particular protocol version.

More specifically, the base station continually measures an aggregate of reverse link transmission power and every 1.67 ms computes a noise metric referred to as reverse noise rise (RNR). RNR is the difference between (i) the reverse noise that the access node is currently detecting and (ii) a baseline level of reverse noise. Thus, the base station computes how far the reverse noise has risen above that baseline. When the computed RNR exceeds a threshold RNR value, the base station sets the RAB to one; when the computed RNR does not exceed the threshold RNR value, the base station sets the RAB to zero. The RNR threshold is a configurable system parameter that can range from 0 dB to 30 dB. Hence, a RAB set to one corresponds to higher reverse-link noise (and less favorable RF conditions), while a RAB set to zero corresponds to lower reverse-link noise (and more favorable RF conditions). For each computation (i.e., 600 times per second), the base station broadcasts the RAB to served access terminals on a Reverse Activity Channel, which is a sub-channel of the forward-link MAC channel. An AT with an active EVDO data session will, in turn, adjust its data channel power level and transmission rate according to the received RAB.

Under IS-856, Rel. 0, an AT can transmit on its reverse link at one of five rates: 9.6 kbps, 19.2 kbps, 38.4 kbps, 76.8 kbps, and 153.6 kbps. The consecutive order of the listed rates defines the order in which the AT may transition between rates. At the start of a data session, the AT transmits at 9.6 kbps, then over the course of the session transitions among the other rates based on received RABs and a transition probability integer for each transition. Specifically, the AT will transition up or down from its current rate to the next consecutive higher or lower rate depending on the value (one or zero) of the RAB and based on a probabilistic test that controls whether or not to make the transition. For a RAB set to one, the AT will transition from its current rate to the next lower rate with a probability determined by the outcome of a test for the particular downward transition. Conversely, for a RAB set to zero, the AT will transition from its current rate to the next higher rate with a probability determined by the outcome of a test for the particular upward transition.

Each probability test is a uniform random selection of an integer between 0 and 255. If the selected integer is smaller than a transition probability integer (also in the range between 0 and 255) for the particular current-to-new rate pair, the AT transitions up or down to the next rate. If the selected integer is not smaller than the transition probability integer, the AT remains at its current rate. The AT then sets its reverse-link data channel transmission power to accommodate the selected rate. If a given increased data rate requires a higher transmission power than the AT is allowed at a particular time, the AT will not make the upward transition.

Operationally, a Rel. 0 AT with an active data session adjusts its data rate in the above-described manner every 16 time slots, corresponding to once per frame. The AT maintains in its memory a table of the allowed rates and the transition probability values for each consecutive pair of rates. The table is typically provided by the RAN as part of initialization or at the start or a call or session.

Under IS-856, Rev. A, an AT sets its reverse-link data channel transmission power according to a determined value of T2P. More specifically, the AT tracks a short-term and a long-term historical indicator of RAB values reported by the base station in order to dynamically adapt T2P for more rapid changes in data rate. Briefly, Rev. A reverse power control treats T2P like a resource, and invokes a mechanism for resource allocation and management that is sometimes referred as a "token bucket." An amount "BucketLevel" of T2P resource in the bucket at any time is a function of an amount "T2PInflow" of T2P resource the AT adds to the bucket added to the bucket and an amount "T2POutflow" the AT uses from the bucket. The AT determines T2PInflow as a function of the short-term RAB indicator, referred to as "QRAB," the long-term RAB indicator, referred to as "FRAB," and the pilot strength of the forward link from the base station (i.e., BTS in the cell or sector).

From the T2P inflow and current BucketLevel, the AT determines an amount of T2P resource that can be used at a given time during a transmission. The AT then sets a packet size and a transmission power level based on the amount of T2P resource that can be used. Note that this amount can sometimes momentarily exceed the inflow rate, and thereby occasionally accommodate high rate data bursts. Also, since the frame size is generally fixed, packet size corresponds to a data density and therefore a data rate; i.e., a larger packet size corresponds to a higher data rate, and vice versa. Under IS-856, Rev. A, effective reverse-link data rates can range from 19.2 kbps up to 1.84 megabits per second (Mbps).

Operation in an IS-856 compliant communication system may be illustrated, again with reference to FIG. 3. To acquire packet data connectivity under IS-856, after an access terminal first detects an EVDO carrier, the access terminal sends to its BSC (or RNC) 308 a UATI (Universal Access Terminal Identifier) request, and receives in response an UATI, which the access terminal can then use to identify itself in subsequent communications with the BSC. The access terminal then sends a connection-request to the BSC 308, and the BSC responsively invokes a process to authenticate the access terminal and to have the access terminal acquire a data link.

In particular, the BSC 308 sends an access request to an Access Network AAA (ANAAA) server (which may be different than the AAA server 322), and the ANAAA server authenticates the access terminal. The BSC 308 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 318 (via PCF 316), and the PDSN and access terminal then negotiate to establish a PPP data link. In addition, as in the IS-2000 process, the access terminal then sends an MIP RRQ to the PDSN, which the PDSN forwards to the HA 324, and the HA assigns a mobile-IP address for the access terminal to use.

3. DYNAMIC ADAPTATION OF REVERSE-LINK POWER CONTROL a. Operating Principles

Under both IS-856, Rel. 0 and IS-856, Rev. A, the reverse power-control procedures are based on one form or another of RAB monitoring by the AT. Since the RAB is an indicator of aggregate reverse-link noise (i.e., RNR), the reverse power-control procedures can be understood as helping to balance the reverse power and data rates achievable by the AT with the AT's contribution to the aggregate reverse-link noise from all ATs served by the base station. In other words, reverse power-control procedures comprise a feedback mechanism, with the RAB acting as a feedback variable.

To the extent that the procedures under Rel. 0 are different from those under Rev. A, a Rel. 0 AT a will contributed differently to the aggregate reverse-link noise than a Rev. A AT. When both Rel. 0 ATs and Rev. A ATs operate in the same cell or sector (or other form of coverage area), the RAB will therefore reflect a mix of differently-determined contributions to the RNR computed by the base station (or BTS). Consequently, the reverse power-control procedures of the Rel. 0 ATs will be accounting for feedback generated by the reverse power-control procedures of the Rev. A ATs, and vice versa. Depending on the relative mix of Rel. 0 ATs and Rev. A ATs in such a situation, the effectiveness and efficiency of the reverse power-control procedures under one of the protocol versions may suffer compared with those under the other protocol version. As a result, the service received by ATs operating according to one protocol version may correspondingly suffer at the expense of that received by ATs operating according to the other protocol version. Accordingly, embodiments of the present invention advantageously adapt reverse power-control procedures based on the relative distribution (or mix) in a cell or sector (or other form of coverage area) of ATs of different protocol versions.

In accordance with an example embodiment, a base station (or BTS) configured to serve both Rel. 0 ATs and Rev. A ATs will keep track of the relative numbers of Rel. 0 and Rev. A that it is serving, and will provide an indication of the relative numbers to the served ATs. The served Rev. A ATs will, in turn, adapt their reverse power-control procedures based on the indication provided by the base station. At the same time, the base station will adapt the target packet error rate that it applies to determining the thresholds for inner-loop power-control on the reverse link so as to cause one of the two types of access terminals power up more slowly than the other. The behavior of both the base station (or BTS) and Rev. A ATs in accordance with the example embodiment are describe more specifically below.

b. Access Terminal Operation

In accordance with the example embodiment, when a Rev. A AT receives a first indication from the base station that the number of Rel. 0 ATs is larger than a threshold fraction of the total number ATs of both types being served by the base station, the Rev. A AT will transition to carrying out reverse power-control procedures according to IS-856, Rel. 0. Conversely, when a Rev. A AT that is operating according to IS-856, Rel. 0 receives a second indication that the number of Rel. 0 ATs is not larger than the threshold fraction of the total number both types of AT, the Rev. A AT will transition to carrying out reverse power-control procedures according to IS-856, Rev. A. If the Rev. A AT is already operating according to IS-856, Rev. A when it receives the second indication, then it will continue to operate according to IS-856, Rev. A.

The indication of the relative numbers to the served Rel. 0 and Rev. A ATs could be sent by the base station in a broadcast message. The message could include a fraction f corresponding to the relative numbers. For example, $f=N_{Rel.0}/(N_{Rev.A}+N_{Rel.0})$, where $N_{Rel.0}$ is the number of Rel. 0 ATs and $N_{Rev.A}$ is the number of Rev. A ATs being served when the message was sent. The Rev. A AT could then compare f with a threshold value $f_{thresh}$, and transition its operational behavior accordingly. In this case, $f_{thresh}$ could be supplied by the base station (or other RAN element) when the AT initializes.

Alternatively, the base station could determine whether or not f exceeds $f_{thresh}$ and include an indication as such in the message. In this case, the AT would not necessarily need to be aware of the threshold fraction, but only whether or not it had been exceeded.

To the extent that the Rev. A AT adapts is reverse power-control procedures to one version or another of IS-856 in accordance with the message received from the base station, the message can be more generally considered to be a "protocol version message." In further accordance with the example embodiment, there could be other conditions determined by the base station that cause it to send a protocol version message, and thereby cause Rev. A ATs to adapt their reverse power-control procedures. That is, the Rev. A AT does not necessarily need to know why it is being instructed to switch from one protocol version to another of reverse power-control. As such, the versatility of causing Rev. A ATs to switch protocol versions may be extended to various conditions monitored by the base station, and even to cover additional and/or different protocols.

c. Base Station Operation

In accordance with the example embodiment, the base station (or BTS) will track or monitor the relative numbers of Rel. 0 ATs and Rev. A ATs that it is serving. For instance, when an access terminal initially requests a traffic channel from the base station, it may include an indication of whether it is a Rel. 0 AT or a Rev. A AT. The base station may, in turn, associate the type (Rel. 0 or Rev. A) with one or another identifier of the AT, such as assigned MAC ID. Thereafter, the base station can tally the AT among the one type or the other based on the identifier. Applying this approach to all the served ATs, the base station may keep a running tally of the numbers of both types of access terminals, and thereby easily compute the relative numbers of each type as the fraction $f=N_{Rel.0}/(N_{Rev.A}+N_{Rel.0})$, and/or any algebraic variation thereof (e.g., $f=N_{Rev.A}/(N_{Rev.A}+N_{Rel.0})$).

In further accordance with the example embodiment, the base station will adapt its reverse power-control procedures based on the determined value of f at various time intervals. More particularly, the base station will modulate power-control commands differently to each of the two types of access terminals in response to the computed value of f. This can be accomplished by separately adjusting two different target packet error rate values, one for Rel. 0 ATs and the other for Rev. A ATs. As described above, a higher value of target packet error rate increases the tolerance for packet errors, and correspondingly decreases the inner-loop $(E_b/N_0)_{setpoint}$, and vice versa. Consequently, a higher value of target packet error rate will generally tend to decrease the number of power-up commands sent to any given AT, and thereby reduce the contribution to RNR from that AT. By adjusting two different target packet error rates, the base station can thus differentiate the rate at which it commands each the two types of access terminals to increase their reverse-link power levels and the amount of power each of the two types contributes to reverse-link noise.

For example, when the value of f indicates that there are a relatively few Rev. A ATs among the total number of ATs served, the base station will increase the target packet error rate for Rev. A ATs while keeping in place a standard (smaller) target packet error rate for the Rel. 0 ATs. The contribution to RNR from Rev. A ATs will thereby be reduced, leaving a larger budget of reverse-link power available for the Rel. 0 ATs. Conversely, when the value of f indicates that there are a relatively few Rel. 0 ATs among the total number of ATs served, the base station will increase the target packet error rate for Rel. 0 ATs while keeping in place a standard (smaller) target packet error rate for the Rev. A ATs. The contribution to RNR from Rel. 0 ATs will thereby be reduced, leaving a larger budget of reverse-link power available for the Rev. A ATs. The amount by which the base station increases the target packet error rate for one type of AT compared with the other could depend on the actual value of f.

In addition to adjusting two different target packet error rates, the base station will also transmit a message indicative of the value of f. This is the protocol version message referred to above. Rev. A ATs served by the base station will, in turn, adapt their reverse power-control procedures in response to the protocol version message, as described above. The message may either contain f, or may otherwise indicate that f has crossed one or another threshold value such that Rev. A ATs should responsively switch from one protocol version to another for carrying out reverse power-control procedures. Accordingly, the protocol version message may be considered an instruction by the base station to Rev. A ATs to switch protocol versions with respect to reverse power-control procedures.

In further accordance with the example embodiment, the base station can combine its separate adjustment of two target packet error rates with its use of protocol version messages for controlling the behavior of Rev. A ATs, in order to introduce a range of overall system behaviors with respect to reverse power-control operation. More particularly, the base station may use one or more thresholds and numerical ranges to compare with f in order to determine what, if any, adaptive actions should be taken. For example, if f exceeds an upper threshold, the base station could instruct Rev. A ATs to operate according to IS-856, Rel. 0. If f is in a more moderate range but still indicates a majority of Rel. 0 ATs, the base station could instruct Rev. A ATs to operate according to IS-856, Rev. A, and at the same time could increase the target packet error rate for Rev. A ATs relative to Rel. 0 ATs. Finally, if f is less than a lower threshold, the base station could again instruct Rev. A ATs to operate according to IS-856, Rev. A, and at the same time could increase the target packet error rate for Rel. 0 ATs relative to Rev. A ATs. Other combinations of actions could be taken as well depending on the value of f.

In still further accordance with the example embodiment, the base station can maintain the one or more thresholds and ranges in its memory (e.g., solid state memory, disk, etc.). By way of example, the base station can maintain an upper threshold $f_{upper}$, a lower threshold $f_{lower}$, and a range $[x_1, x_2]$, which can be applied to the computed value of f. Also by way of example, values for thresholds and ranges could be $f_{upper}=0.9$, $f_{lower}=0.3$, $X_1=0.7$, and $x_2=0.9$. It will be appreciated that different and/or additional values and numerical ranges could be used.

Specific actions taken by the base station in response to computed values of f could be as follows.

For $f \geq f_{upper}$, the base station will set a standard value of target packet error rate for both Rel. 0 ATs and Rev. A ATs, and also instruct Rev. A ATs to switch to IS-856, Rel. 0 operation. As an example, the standard rate could be 0.01 (i.e., one percent).

For $x_1 \leq f < x_2$, the base station will increase the target packet error rate for Rev. A ATs, set a standard value of target packet error rate for Rel. 0 ATs, and also instruct Rev. A ATs to switch to IS-856, Rev. A operation. As an example, the increased rate could be 0.03 (i.e., three percent).

For $f < f_{lower}$, the base station will the base station increase the target packet error rate for Rel. 0 ATs, set a standard value of target packet error rate for Rev. A ATs, and also instruct Rev. A ATs to switch to IS-856, Rev. A operation. Again, the increased rate could be 0.03 (i.e., three percent).

Through these actions, the base station can advantageously improve the efficiency of reverse power-control procedures, as well as the fairness of the reverse power-control operation among a mix (or distribution) of ATs using different protocol versions. It will be appreciated that other actions could be implemented as well.

4. IMPLEMENTATION OF EXAMPLE EMBODIMENT

As described above, the example embodiment involves actions and operations carried out by both the Rev. A access terminal and the base station (or BTS). As such, the example embodiment may be considered as comprising a "client-side," associated with the access terminal (or other client communication device), and a "system-side," associated with the base station (or BTS). The example embodiment can be implemented as executable steps and operations of a client-side method carried out by an access terminal, and as executable steps and operations of a system-side method carried out by a base station (or BTS cell or sector).

Implementation of the example embodiment can further be considered as including means for carrying out both the client-side method and the system-side method. An example implementation of both the client-side method and means and the system-side method and means is described below. By way of example, both the access terminal and the base station are taken to be configured to operate according to IS-856 in a similarly-compliant wireless communication system, such as the one described above in connection with FIG. 3. More specifically, the access terminal is taken to be a Rev. A AT, and the base station is assumed to be configured to support both IS-856, Rel. 0 and IS-856, Rev. A.

a. Example Method Implementation in an Access Terminal

Figure 4:
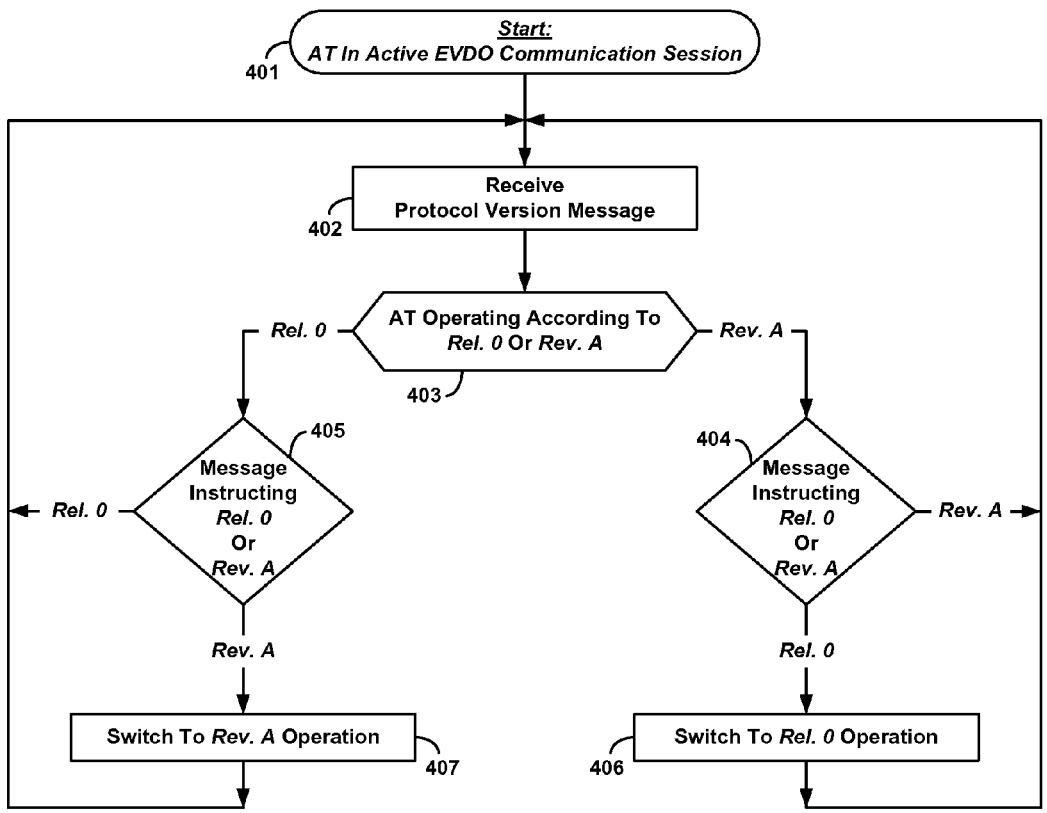
FIG. 4 illustrates an example embodiment of logical steps for implementing in an AT a method of dynamic adaptation of reverse-link power control based on the distribution of ATs implementing different protocol versions.

FIG. 4 is a logical flowchart representing executable steps and operations that could be carried out by an access terminal to implement an example client-side method of dynamic adaptation of reverse-link power control based on the distribution of ATs implementing different protocol versions. The illustrated steps could be implemented in a Rev. A AT (or similar device) as executable instructions stored in the memory of the AT and executed by one or more processors of the AT.

At the start 401, the Rev. A AT is engaged in an active EVDO communication session via a BTS (or base station). As such, the access terminal is carrying out reverse power-control procedures according to one or another of IS-856, Rel. 0 and IS-856, Rev. A.

At step 402, the AT receives a protocol version message from the base station. As described above, the message could contain an indication of the relative numbers of Rel. 0 ATs and Rev. A ATs being served by the base station. More generally, the message provides an indication that the AT should operate according to one or the other of the two protocols.

Step 403 represents a branching of execution according to whether the AT is currently operating according to Rel. 0 or Rev. A. Actions based on the received protocol version message depend on which of the two protocol versions the AT is operating under when the message is received. If the AT is operating according to Rev. A ("Rev. A" branch from step 403), the AT interprets the protocol version message at step 404.

If the protocol version message is determined at step 404 to be instructing the AT to operate according to Rel. 0 ("Rel. 0" branch from step 404), the AT switches from Rev. A operation to Rel. 0 operation at step 406. The AT then returns to just above step 402, in effect waiting for the next protocol version message. If the protocol version message is determined at step 404 to be instructing the AT to operate according to Rev. A ("Rev. A" branch from step 404), the AT returns to just above step 402 without switching protocol versions, again awaiting the next protocol version message.

If at step 403 the AT is operating according to Rel. 0 ("Rel. 0" branch from step 403), the AT interprets the protocol version message at step 405.

If the protocol version message is determined at step 405 to be instructing the AT to operate according to Rev. A ("Rev. A" branch from step 405), the AT switches from Rel. 0 operation to Rev. A operation at step 407. The AT then returns to just above step 402, in effect waiting for the next protocol version message. If the protocol version message is determined at step 405 to be instructing the AT to operate according to Rel. 0 ("Rel. 0" branch from step 405), the AT returns to just above step 402 without switching protocol versions, again awaiting the next protocol version message.

It will be appreciated that the steps shown in FIG. 4 are meant to illustrate operation of example embodiments. As such, various steps could be altered or modified, the ordering of certain steps could be changed, and additional steps could be added, while still achieving the overall desired operation.

b. Example Method Implementation in a Base Station

Figure 5:
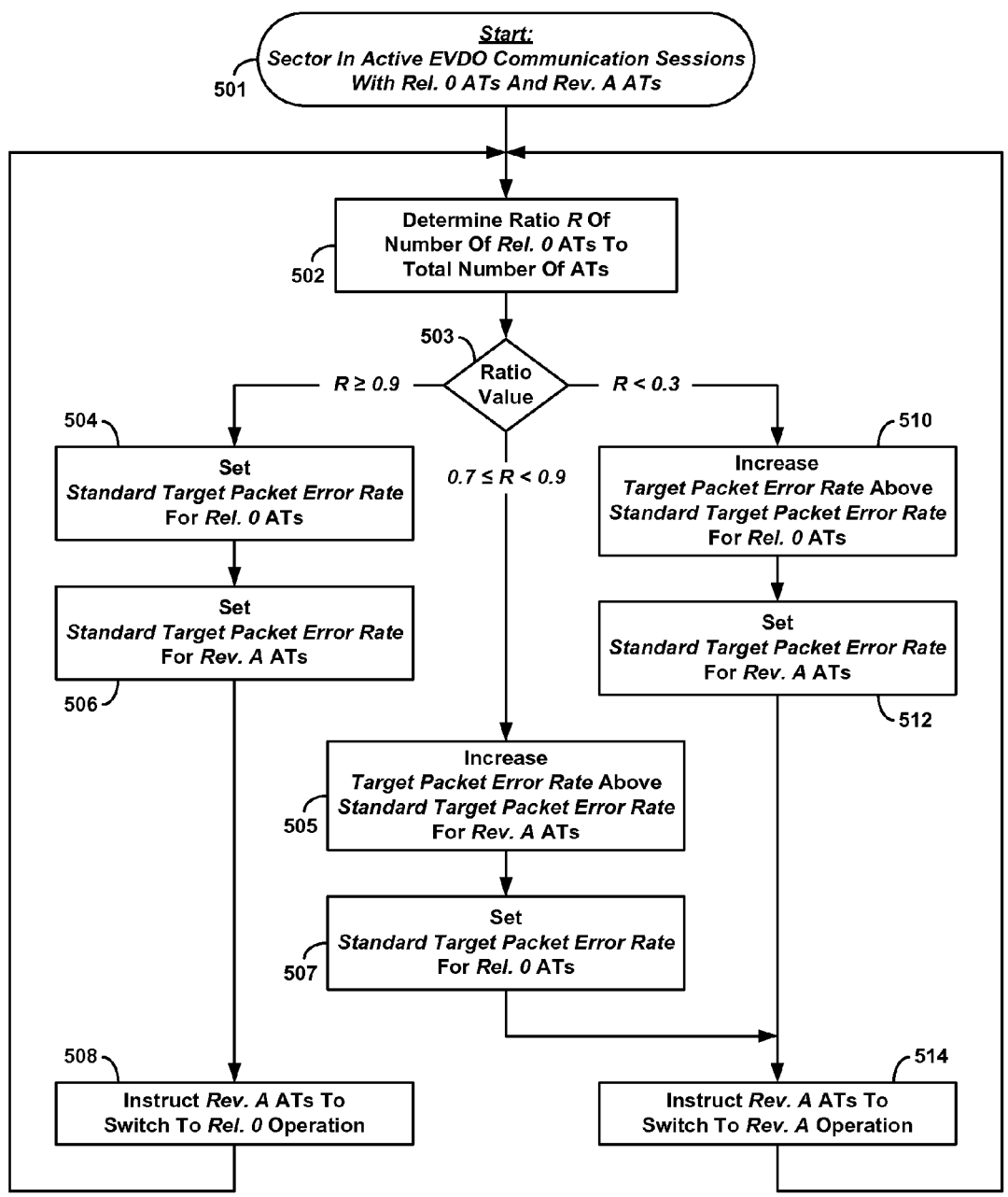
FIG. 5 illustrates an example embodiment of logical steps for implementing in a base station a method of dynamic adaptation of reverse-link power control based on the distribution of ATs implementing different protocol versions.

FIG. 5 is a logical flowchart representing executable steps and operations that could be carried out by base station to implement an example system-side method of dynamic adaptation of reverse-link power control based on the distribution of ATs implementing different protocol versions. The illustrated steps could be implemented in a base station, BTS (or other RAN element) as executable instructions stored in the memory of the base station and executed by one or more processors of the base station.

At the start 501, a sector associated with the base station is engaged in one or more active EVDO communication sessions with Rel. 0 ATs and/or Rev. A ATs. At step 502, a ratio R of the number or Rel. 0 ATs to the total number or ATs is determined. Here, the term "ratio" replaces the term "fraction" used above, so that R is define identically to f above. As described above, the base station (or sector BTS) could have associated an identifier of each AT with protocol version type when each session was established. Other ways of making the determination of protocol version types and calculating R are possible as well.

Step 503 represents a branching step, wherein one of three execution branches is taken depending on the value of R. If R is at least as great as 0.9, ("R≧0.9" branch from step 503), the base station sets a target packet error rate for Rel. 0 ATs to a standard value at step 504, and sets a target packet error rate for Rev. A ATs also to the standard value at step 506. By way of example, the standard value could be 0.01 (or one percent).

With R≧0.9, few of the served ATs are Rev. A ATs (10 percent or less), so at step 508 the base station instructs the Rev. A ATs to operate according to IS-856, Rel. 0. In accordance with the example embodiment, the base station will issue this instruction by broadcasting a protocol version message containing an indication that Rev. A ATs should switch to Rel. 0 operation (if they are not already operating according to Rel. 0). The indication could be the value of R that the Rev. A ATs then interpret as described above, for instance, or could be a more explicit instruction. Execution then returns to step 502, where the base station makes a new determination of R.

If at step 503, R is determined to be in the range from 0.7 to 0.9 ("0.7≦R<0.9" branch from step 503), the base station increases the target packet error rate for Rev. A ATs to above the standard value at step 505, while keeping the target packet error rate for Rel. 0 ATs set to the standard value at step 507. By way of example, the increased value could be 0.03 (or three percent).

At step 514, the base station then instructs the Rev. A ATs to operate according to IS-856, Rev. A. With 0.7≦R<0.9, the majority of ATs with active EVDO session in the sector are still Rel. 0 ATs, but the increased target packet error rate for the Rev. A ATs will lessen their contribution to RNR in the sector even if they operate according to Rev. A. Again, this instruction could be issued by broadcasting a protocol version message, but one indicating that Rev. A ATs should switch to Rev. A operation (if they are not already operating according to Rev. A). As above, the indication could be either the value of R that the Rev. A ATs interpret as described above or a more explicit instruction. Execution again returns to step 502, where the base station makes a new determination of R.

If at step 503, R is determined to be less than 0.3 ("R<0.3" branch from step 503), the base station increases the target packet error rate for Rel. 0 ATs to above the standard value at step 510, while keeping the target packet error rate for Rev. A ATs set to the standard value at step 512. Again by way of example, the increased value could be 0.03 (or three percent).

Execution again goes to step 514, where the base station instructs the Rev. A ATs to operate according to IS-856, Rev. A. With R<0.3, the majority of ATs with active EVDO session in the sector are now Rev. A ATs. In this case, the increased target packet error rate for the Rel. 0 ATs will lessen their contribution to RNR. Once more, this instruction could be issued by broadcasting a protocol version message indicating that Rev. A ATs should switch to Rev. A operation (if they are not already operating according to Rev. A). Execution again returns to step 502, where the base station makes a new determination of R.

It will be appreciated that the steps shown in FIG. 5 are meant to illustrate operation of example embodiments. As such, various steps could be altered or modified, the ordering of certain steps could be changed, and additional steps could be added, while still achieving the overall desired operation. It will also be appreciated that the particular threshold values and ranges against which R is compared could be different from those of the present illustration.

c. Example Access Terminal

Figure 6:
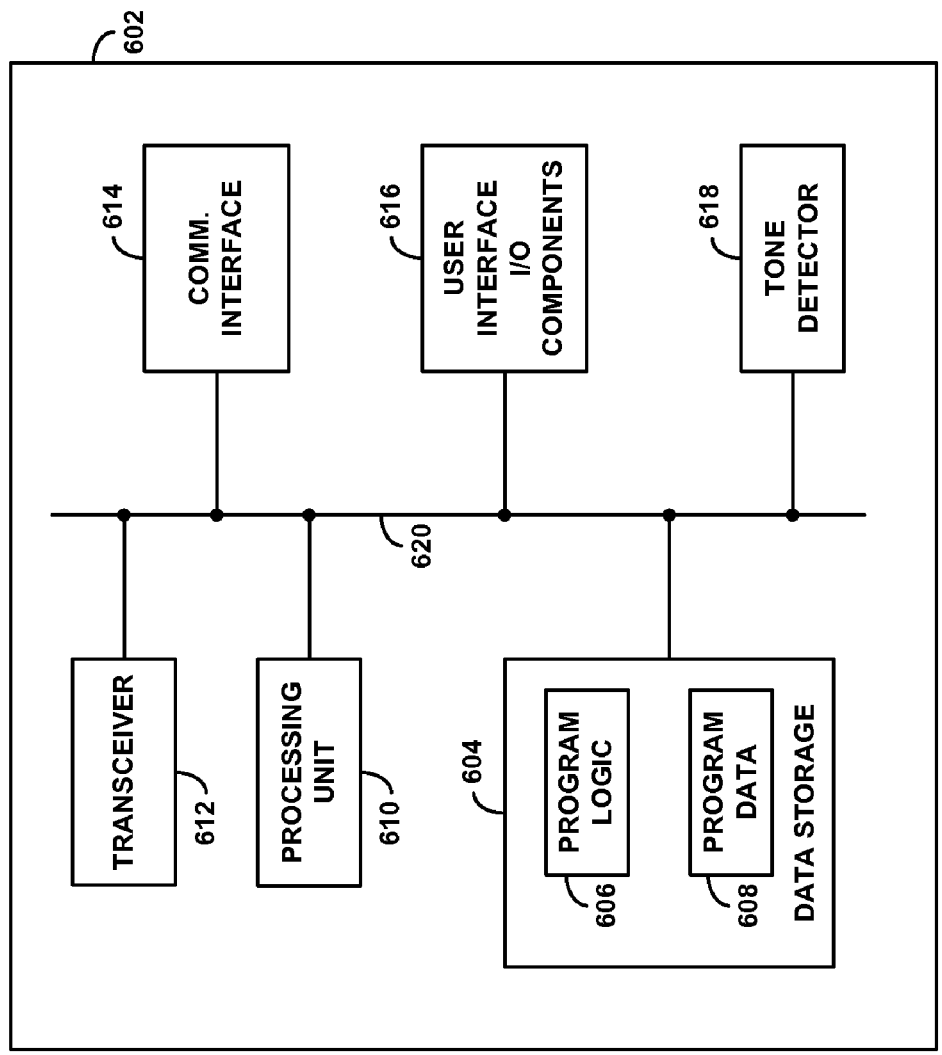
FIG. 6 is a block diagram of an example access terminal in which dynamic adaptation of reverse-link power control based on the distribution of ATs implementing different protocol versions may be implemented.

FIG. 6 is a simplified block diagram depicting functional components of an example access terminal 602 in which client-side operation of dynamic adaptation of reverse-link power control based on the distribution of ATs implementing different protocol versions may be implemented. The example AT 602 could be a cell phone, a personal digital assistant (PDA), a pager, a wired or wirelessly-equipped notebook computer, or any other sort of device. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 602 relevant to dynamic adaptation of reverse-link power control based are discussed briefly below.

Communication interface 614 in combination with transceiver 612, which may include one or more antennas, enables communication with the network, including reception of noise-level messages (e.g., RAB broadcasts) from the serving base station and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation such as that discussed above and illustrated in FIG. 4. Further, program data 608 may be arranged to store local thresholds and ranges for comparing R, as described above.

It will be appreciated that there can be numerous specific implementations of an access terminal, such as AT 602, in which the client-side method of dynamic adaptation of reverse-link power control based on the distribution of ATs implementing different protocol versions could be implemented. Further, one of skill in the art would understand how to devise and build such an implementation. As such, AT 602 is representative of means for carrying out the client-side method of dynamic adaptation of reverse-link power control based on the distribution of ATs implementing different protocol versions, in accordance with the methods and steps described herein by way of example.

d. Example Base Station

Figure 7:
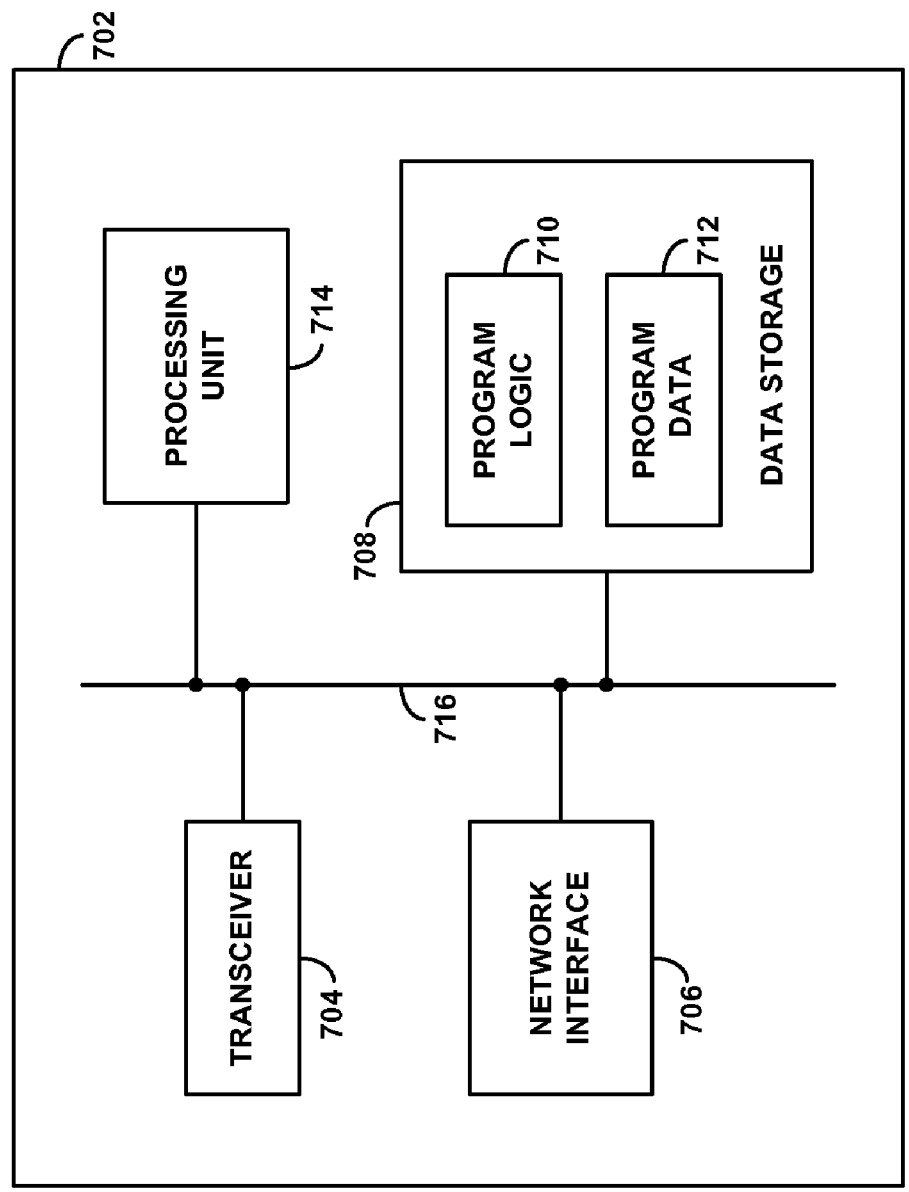
FIG. 7 is a block diagram of an example base station in which dynamic adaptation of reverse-link power control based on the distribution of ATs implementing different protocol versions may be implemented.

FIG. 7 is a simplified block diagram depicting functional components of an example base station 702 in which system-side operation of dynamic adaptation of reverse-link power control based on the distribution of ATs implementing different protocol versions may be implemented. As shown in FIG. 7, the example base station 702, representative of BTS 304 or BSC 306 integrated with BTS 304 in FIG. 3, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 702 relevant to dynamic adaptation of reverse-link power control based on the distribution of ATs implementing different protocol versions are discussed briefly below.

Network interface 706 enables communication on a network, such network 300. As such, network interface 706 may take the form of trunk or optical link that can be coupled with a TDM switch such as MSC 308, or an Ethernet network interface card or other physical connection that can be coupled with PCF 314, for instance. Further, network interface 706 in combination with transceiver 704, which may include one or more BTS antennas, enables air interface communication with one or more access terminals, supporting forward-link transmissions of protocol version messages, among other message and commands, and supporting reception reverse-link traffic on reverse links.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program logic 710 may comprise machine language instructions that define routines executable by processing unit 714 to carry out various functions described herein. In particular the program logic, communication interface, and transceiver may operate cooperatively to carry out logical operation such as that discussed above and illustrated in FIG. 5. Further, program data 712 may be arranged to store local thresholds and ranges for comparing R, as described above.

It will be appreciated that there can be numerous specific implementations of a base station (or BTS or other RAN element), such as base station 702, in which the system-side method of dynamic adaptation of reverse-link power control based on the distribution of ATs implementing different protocol versions could be implemented. Further, one of skill in the art would understand how to devise and build such an implementation. As such, base station 702 is representative of means for carrying out the system-side method of dynamic adaptation of reverse-link power control based on the distribution of ATs implementing different protocol versions, in accordance with the methods and steps described herein by way of example.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal operating in a wireless communication system that includes a base station, a method comprising:
   operating in a first state in which at least: the access terminal uses a first protocol for determining and adjusting transmission power on a reverse link of an air interface with the base station;
   while operating in the first state, receiving a protocol version message from the base station on a forward link of the air interface and responsively transitioning to operating in a second state in which at least: the access terminal uses a second protocol for determining and adjusting transmission power on the reverse link of the air interface with the base station,
   wherein the first protocol is IS-856, Rev. A and the second protocol is IS-856, Rel. 0,
   wherein the base station is configured to serve both a first type of access terminal that is capable of operating according to both the first protocol and the second protocol, and a second type of access terminal that is capable of operating only according to the second protocol,
   wherein the access terminal is of the first type and is being served by the base station,
   and wherein receiving the protocol version message from the base station comprises receiving an indication that the base station is serving a number of access terminals of the second type that is larger than a threshold fraction of a total number of access terminals of both the first and second types being served by the base station.

2. In an access terminal operating in a wireless communication system that includes a base station, a method comprising:
   operating in a first state in which at least: the access terminal uses a first protocol for determining and adjusting transmission power on a reverse link of an air interface with the base station;
   while operating in the first state, receiving a protocol version message from the base station on a forward link of the air interface and responsively transitioning to operating in a second state in which at least: the access terminal uses a second protocol for determining and adjusting transmission power on the reverse link of the air interface with the base station,
   wherein the first protocol is IS-856, Rel. 0 and the second protocol is IS-856, Rev. A,
   wherein the base station is configured to serve both a first type of access terminal that is capable of operating according to both the first protocol and the second protocol, and a second type of access terminal that is capable of operating only according to the first protocol,
   wherein the access terminal is of the first type and is being served by the base station,
   and wherein receiving the protocol version message from the base station comprises receiving an indication that the base station is serving a number of access terminals of the second type that does not exceed a threshold fraction of a total number of access terminals of both the first and second types being served by the base station.

3. The method of claim 1, wherein the base station comprises a BTS and a coverage area, the coverage area being at least one of a cell and a sector,
   wherein the reverse link of the air interface with the base station comprises a data traffic channel of the coverage area for transmitting data to the BTS,
   and wherein using the first protocol for determining and adjusting transmission power on the reverse link of the air interface with the base station comprises:
   receiving a given noise-level message from the BTS, the given noise-level message indicating a loading condition due to transmissions to the BTS from one or more access terminals in the coverage area;
   determining both a first transmission power level for the data traffic channel and a first reverse-link data rate for the data traffic channel based at least on the received given noise-level message and on the first protocol; and
   transmitting data on the data traffic channel at the determined first reverse-link data rate and determined first transmission power level.

4. The method of claim 3, wherein using the second protocol for determining and adjusting transmission power on the reverse link of the air interface with the base station comprises:
   receiving a particular noise-level message from the BTS, the particular noise-level message indicating a loading condition due to transmissions to the BTS from one or more access terminals in the coverage area;
   determining both a second transmission power level for the data traffic channel and a second reverse-link data rate for the data traffic channel based at least on the received particular noise-level message and on the second protocol; and
   transmitting data on the data traffic channel at the determined second reverse-link data rate and determined second transmission power.

5. The method of claim 4, wherein
   the given noise-level message and the particular noise-level message each comprise a reverse activity bit value set by the BTS according to a measured value of reverse noise rise.

6. In a base station operating as part of a wireless communication system and configured to serve both a first type of access terminal capable of operating according to a first and a second protocol for reverse power control, and a second type of access terminal capable of operating only according to the second protocol, wherein the first protocol is different from the second protocol, a method comprising:

serving a total number of access terminals of both the first and second types, wherein serving any given access terminal of either type comprises transmitting data to and receiving data from the given access terminal via an air interface link with the given access terminal;

determining a ratio of a number of access terminals of the second type being served by the base station to the total number of access terminals of both the first and second types being served by the base station;

setting a first threshold error rate based on the determined ratio, the first threshold error rate (i) corresponding to a threshold rate of errors in transmissions received from access terminals of the first type, and (ii) being used by the base station to modulate reverse power-control commands sent to access terminals of the first type being served by base station; and setting a second threshold error rate based on the determined ratio, the second threshold error rate (i) corresponding to a threshold rate of errors in transmissions received from access terminals of the second type, and (ii) being used by the base station to modulate reverse power-control commands sent to access terminals of the second type being served by base station.

7. The method of claim 6, wherein the determined ratio is one of: (i) a first value that is at least as larger as a first threshold ratio, (ii) a second value that is at least as large as a second threshold ratio and smaller than the first threshold ratio, and (iii) a third value that is smaller than a third threshold ratio, wherein the third threshold ratio is no greater than the second threshold ratio.

8. The method of claim 7, wherein setting the first threshold error rate based on the determined ratio comprises: responsive to determining that the ratio is the first value, setting the first threshold error rate to a standard value, and wherein setting the second threshold error rate based on the determined ratio comprises: responsive to determining that the ratio is the first value, setting the second threshold error rate to the standard value.

9. The method of claim 7, wherein setting the first threshold error rate based on the determined ratio comprises: responsive to determining that the ratio is the second value, setting the first threshold error rate to an elevated value that is larger than a standard value, and wherein setting the second threshold error rate based on the determined ratio comprises: responsive to determining that the ratio is the second value, setting the second threshold error rate to the standard value.

10. The method of claim 7, wherein setting the first threshold error rate based on the determined ratio comprises: responsive to determining that the ratio is the third value, setting the first threshold error rate to a standard value, and wherein setting the second threshold error rate based on the determined ratio comprises: responsive to determining that the ratio is the second value, setting the second threshold error rate to an elevated value that is larger than the standard value.

11. The method of claim 7, further comprising:
responsive to determining that the ratio is the first value, transmitting a message to access terminals of the first type being served by the base station directing them to operate according to the second protocol; and responsive to determining that the ratio smaller than the first threshold value, transmitting a message to access terminals of the first type being served by the base station directing them to operate according to the first protocol.

12. The method of claim 6, wherein the first protocol is IS-856, Rev. A and the second protocol is IS-856, Rel. 0.

13. The method of claim 6, wherein the base station is configured to operate according to a CDMA family of protocols including IS-856, Rel. 0 and IS-856, Rev. A, wherein the base station comprises a BTS and a coverage area, the coverage area being at least one of a cell and a sector, and wherein serving the total number of access terminals of both the first and second types comprises serving each of the total number of access terminals of both the first and second types within the coverage area via an air interface link with the BTS.

14. The method of claim 13, wherein the reverse power-control commands comprise power-up and power-down commands transmitted from the BTS to access terminals both types according to an inner-loop power-control protocol, wherein the first threshold error rate corresponds to a first target packet error rate of an outer-loop power control protocol applied to access terminals of the first type being served by base station, and wherein the second threshold error rate corresponds to a second target packet error rate of the outer-loop power control protocol applied to access terminals of the second type being served by base station.

15. An access terminal configured for operating in wireless communication system that includes a base station, the access terminal comprising:

means for operating in a first state in which at least: the access terminal uses a first protocol for determining and adjusting transmission power on a reverse link of an air interface configured for communicating with the base station;

means for operating in a second state in which at least: the access terminal uses a second protocol for determining and adjusting transmission power on the reverse link of the air interface;

means for receiving a protocol version message from the base station on a forward link of the air interface while operating in the first state; and means for transitioning from operating the first state to operating in the second state in response to receiving the protocol version message from the base station, wherein the base station is configured to serve both a first type of access terminal that is capable of operating according to both the first protocol and the second protocol, and a second type of access terminal that is capable of operating only according to the second protocol, wherein the access terminal is of the first type, wherein the first protocol is IS-856, Rev. A and the second protocol is IS-856, Rel. 0, and the protocol version message comprises an indication that the base station is serving a number of access terminals of the second type that is larger than a threshold fraction of a total number of access terminals of both the first and second types being served by the base station.

16. An access terminal configured for operating in wireless communication system that includes a base station, the access terminal comprising:

means for operating in a first state in which at least: the access terminal uses a first protocol for determining and adjusting transmission power on a reverse link of an air interface configured for communicating with the base station;

means for operating in a second state in which at least: the access terminal uses a second protocol for determining and adjusting transmission power on the reverse link of the air interface;

means for receiving a protocol version message from the base station on a forward link of the air interface while operating in the first state; and means for transitioning from operating the first state to operating in the second state in response to receiving the protocol version message from the base station, wherein the base station is configured to serve both a first type of access terminal that is capable of operating according to both the first protocol and the second protocol, and a second type of access terminal that is capable of operating only according to the first protocol, wherein the access terminal is of the first type, wherein the first protocol is IS-856, Rel. 0 and the second protocol is IS-856, Rev. A, and the protocol version message comprises an indication that the base station is serving a number of access terminals of the second type that does not exceed a threshold fraction of a total number of access terminals of both the first and second types being served by the base station.

17. The access terminal of claim 15, wherein the reverse link of the air interface comprises a data traffic channel for transmitting traffic data to the base station, wherein using the first protocol for determining and adjusting transmission power on the reverse link of the air interface comprises:

receiving a given reverse activity bit (RAB) from the base station;

determining both a first transmission power level for the data traffic channel and a first reverse-link data rate for the data traffic channel based at least on the received given RAB and on the first protocol; and transmitting data on the data traffic channel at the determined first reverse-link data rate and determined first transmission power level, and wherein using the second protocol for determining and adjusting transmission power on the reverse link of the air interface comprises:

receiving a particular RAB from the base station;

determining both a second transmission power level for the data traffic channel and a second reverse-link data rate for the data traffic channel based at least on the received particular RAB and on the second protocol; and transmitting data on the data traffic channel at the determined second reverse-link data rate and determined second transmission power level.

18. A base station configured to operate as part of a wireless communication system, and further configured to serve both a first type of access terminal capable of operating according to a first and a second protocol for reverse power control, and a second type of access terminal capable of operating only according to the second protocol, wherein the first protocol is different from the second protocol, the base station comprising:

means for serving a total number of access terminals of both the first and second types, wherein serving any given access terminal of either type comprises transmitting data to and receiving data from the given access terminal via an air interface link with the given access terminal;

means for determining a ratio of a number of access terminals of the second type being served by the base station to the total number of access terminals of both the first and second types being served by the base station;

means for setting a first threshold error rate based on the determined ratio, the first threshold error rate (i) corresponding to a threshold rate of errors in transmissions received from access terminals of the first type, and (ii) being used by the base station to modulate reverse power-control commands sent to access terminals of the first type being served by base station; and means for setting a second threshold error rate based on the determined ratio, the second threshold error rate (i) corresponding to a threshold rate of errors in transmissions received from access terminals of the second type, and (ii) being used by the base station to modulate reverse power-control commands sent to access terminals of the second type being served by base station.

19. The base station of claim 18, wherein the determined ratio is one of: (i) a first value that is at least as larger as a first threshold ratio, (ii) a second value that is at least as large as a second threshold ratio and smaller than the first threshold ratio, and (iii) a third value that is smaller than a third threshold ratio, wherein the third threshold ratio is no greater than the second threshold ratio, wherein setting the first threshold error rate based on the determined ratio comprises:

responsive to determining that the ratio is one of the first value and the third value, setting the first threshold error rate to a standard value; and responsive to determining that the ratio is the second value, setting the first threshold error rate to a first elevated value that is larger than a standard value;

and wherein setting the second threshold error rate based on the determined ratio comprises:

responsive to determining that the ratio is one of the first value and the second value, setting the second threshold error rate to the standard value; and responsive to determining that the ratio is the third value, setting the second threshold error rate to a second elevated value that is larger than the standard value.

20. The base station of claim 19, further comprising:

means for transmitting a message to access terminals of the first type being served by the base station responsive to determining that the ratio is the first value, the message directing the access terminals of the first type to operate according to the second protocol; and means for transmitting a message to access terminals of the first type being served by the base station responsive to determining that the ratio smaller than the first threshold value, the message directing the access terminals of the first type to operate according to the first protocol.

21. The base station of claim 18, wherein the first protocol is IS-856, Rev. A and the second protocol is IS-856, Rel. 0, wherein the reverse power-control commands comprise power-up and power-down commands transmitted from the BTS to access terminals both types according to an inner-loop power-control protocol, wherein the first threshold error rate corresponds to a first target packet error rate of an outer-loop power control protocol applied to access terminals of the first type being served by base station, and wherein the second threshold error rate corresponds to a second target packet error rate of the outer-loop power control protocol applied to access terminals of the second type being served by base station.

22. The method of claim 2, wherein the base station comprises a BTS and a coverage area, the coverage area being at least one of a cell and a sector, wherein the reverse link of the air interface with the base station comprises a data traffic channel of the coverage area for transmitting data to the BTS, and wherein using the first protocol for determining and adjusting transmission power on the reverse link of the air interface with the base station comprises:

receiving a given noise-level message from the BTS, the given noise-level message indicating a loading condition due to transmissions to the BTS from one or more access terminals in the coverage area;

determining both a first transmission power level for the data traffic channel and a first reverse-link data rate for the data traffic channel based at least on the received given noise-level message and on the first protocol; and transmitting data on the data traffic channel at the determined first reverse-link data rate and determined first transmission power level.

23. The method of claim 22, wherein using the second protocol for determining and adjusting transmission power on the reverse link of the air interface with the base station comprises:

receiving a particular noise-level message from the BTS, the particular noise-level message indicating a loading condition due to transmissions to the BTS from one or more access terminals in the coverage area;

determining both a second transmission power level for the data traffic channel and a second reverse-link data rate for the data traffic channel based at least on the received particular noise-level message and on the second protocol; and transmitting data on the data traffic channel at the determined second reverse-link data rate and determined second transmission power.

24. The method of claim 23, wherein the given noise-level message and the particular noise-level message each comprise a reverse activity bit value set by the BTS according to a measured value of reverse noise rise.

25. The access terminal of claim 16, wherein the reverse link of the air interface comprises a data traffic channel for transmitting traffic data to the base station, wherein using the first protocol for determining and adjusting transmission power on the reverse link of the air interface comprises:

receiving a given reverse activity bit (RAB) from the base station;

determining both a first transmission power level for the data traffic channel and a first reverse-link data rate for the data traffic channel based at least on the received given RAB and on the first protocol; and transmitting data on the data traffic channel at the determined first reverse-link data rate and determined first transmission power level, and wherein using the second protocol for determining and adjusting transmission power on the reverse link of the air interface comprises:

receiving a particular RAB from the base station;

determining both a second transmission power level for the data traffic channel and a second reverse-link data rate for the data traffic channel based at least on the received particular RAB and on the second protocol; and transmitting data on the data traffic channel at the determined second reverse-link data rate and determined second transmission power level.

* * * * *